3,328,705
PEAK DETECTOR
John M. Eubanks, Greensboro, N.C., assignor to Bell Telephone Laboratories, Incorporated, New York, N.Y., a corporation of New York
Filed July 6, 1964, Ser. No. 380,692
8 Claims. (Cl. 328—151)

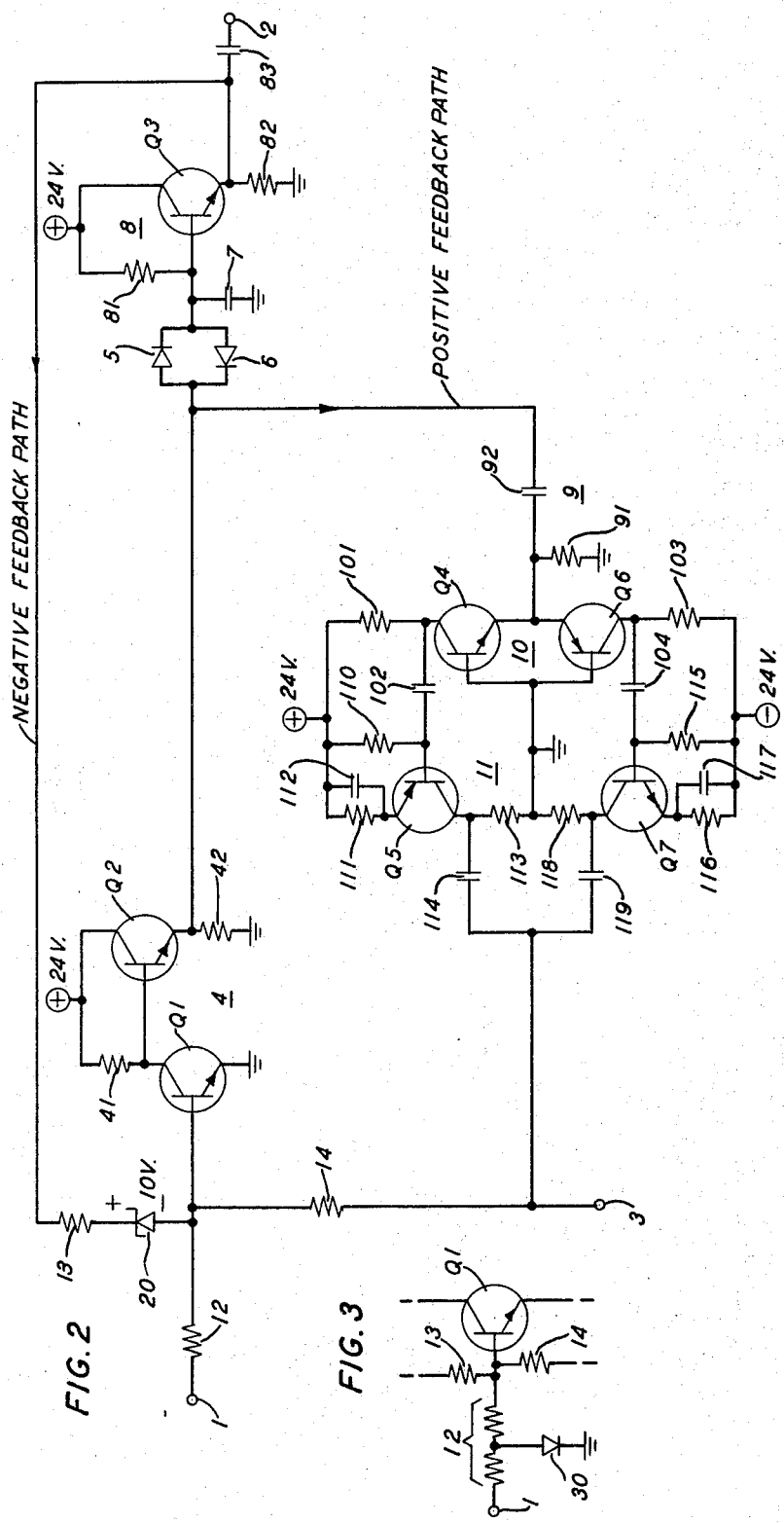

This invention relates to the art of peak voltage detection and more particularly to a peak detector capable of determining not only the peak amplitude of a random signal but also its polarity and its instant of arrival.

In many electrical applications it is necessary to determine the peak amplitude of some voltage wave, sometimes on a random basis. This signal usually appears as an analog quantity and must be converted to a digital number for processing in modern day computer and logic circuitry. Where these voltage waves are of relatively short duration, it is necessary to not only detect the existence of the peak but to also hold its magnitude for a period of time sufficient to enable data processing equipment to convert the analog value to a digital number to be either utilized immediately by the data processing equipment or stored therein for future use. Peak detection is frequently performed by charging a capacitor through a diode so that the capacitor voltage is caused to closely follow the voltage wave and, after the peak has passed, the diode becomes nonconductive to trap a voltage approximating the peak voltage on the capacitor. Subsequently, other circuit means are used to measure or otherwise use this voltage and then remove the charge from the capacitor to prepare it for the arrival of the next voltage wave. These circuits generally have considerable complexity and usually require an external reset means to remove the charge on the capacitor. Moreover, these circuits provide no means for determining and indicating the time of arrival of the peak. To rapidly determine the peak values of a series of randomly received peak voltages, it is desirable that the reset operation be simplified and made automatic. It is also very desirable at times to know exactly when the peak voltage is reached.

It is an object of this invention to determine the peak value of a random signal wave and to indicate its polarity and its time of arrival in an improved and simplified manner.

The foregoing object is achieved by this invention which comprises an amplifier having both a negative feedback loop and a positive feedback loop with a diode-capacitor circuit coupling two of its stages. A diode opens when the capacitor is charged to the peak voltage, leaving the peak voltage trapped on the capacitor for a short period of time during which the positive feedback loop is closed and the negative feedback loop is opened. The amplifier thus becomes momentarily regenerative. The circuit has two output terminals and, at one of these terminals, a voltage proportional to the peak voltage remains constant during the period that the amplifier is regenerative. A sharp voltage pulse appears at the other output terminal during this same period, the polarity of which determines the polarity of the signal voltage and its instant of arrival determines the instant that the peak voltage is reached.

The invention may be better understood by reference to the accompanying drawings, in which:

FIG. 2 is illustrative of a practical embodiment of the invention providing bipolar input signal operation; and FIG. 3 illustrates a modification of the input circuit of FIG. 2 to provide unipolar operation.

Figure 1:
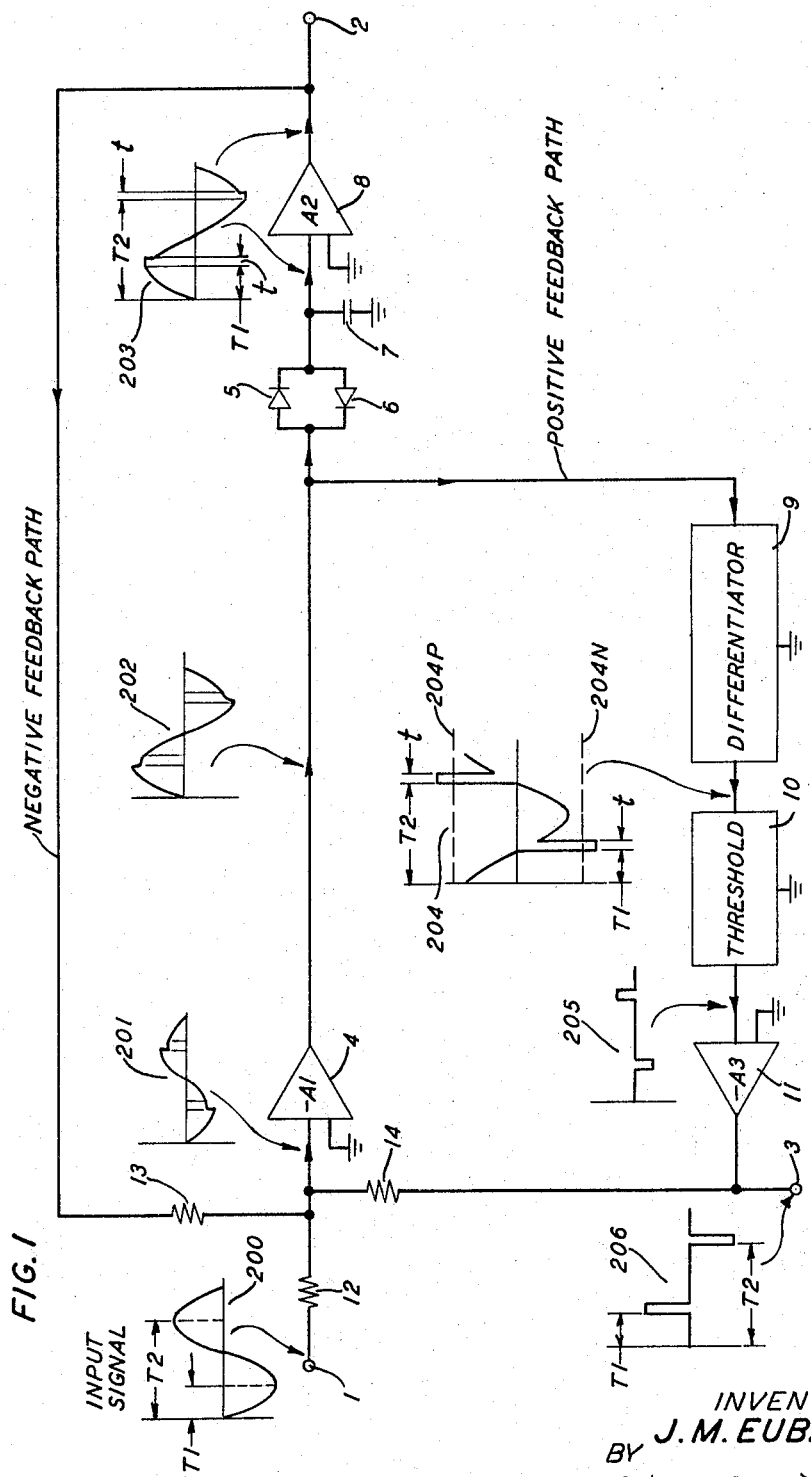
FIG. 1 is a block diagram showing the essential elements of the invention together with typical waveforms for a sine wave input.

The block diagram of FIG. 1 shows an input terminal 1 and two output terminals 2 and 3. Input terminal 1 is connected to the input circuit of an amplifier unit 4 through a resistor 12. The output circuit of amplifier unit 4 is connected to the input circuit of amplifier unit 8 by way of a pair of diodes 5 and 6 poled in opposite directions and connected in parallel. The output circuit of amplifier unit 8 is connected to output terminal 2 as well as to the input circuit of amplifier unit 4 by way of a negative feedback path including resistor 13. Except for the introduction of the two diodes 5 and 6, this circuit as so far described would appear essentially the same as any conventional operational amplifier. Amplifier unit 4 is assumed to have a gain of —A1, the negative sign indicating that the input wave is inverted in the output circuit, i.e., reversed in phase. The gain of unit 8 is indicated as A2 and does not produce a phase inversion. Capacitor 7 is connected between ground and the input terminal of amplifier unit 8. A positive feedback path is connected between the output terminal of amplifier unit 4 and its input terminal by way of a differentiator 9, a threshold circuit 10, an inverting amplifier unit 11 having a gain of —A3 and a resistor 14. The output terminal 3 is also connected to the output circuit of amplifier unit 11.

The operation of this circuit may be best described in conjunction with the waveforms 201 through 206 shown in FIG. 1. While the invention is not restricted to the detection of the peaks of sine waves, it is convenient to use a sine wave for illustrative purposes in explaining the circuit operation. The waveform 200 is a sinusoid going into its negative excursion after zero time. Its negative peak is reached at time T1 and 180 degrees later its positive peak is reached at time T2. It is desired to produce output voltages at terminal 2 proportional to these peak voltages, each voltage being held for a sufficient length of time to enable data processing equipment to receive and convert it into the language of data processing equipment, generally a binary number. During the initial negative excursion of the sine wave and prior to reaching its negative peak at time T1, a wave of the same form but of considerably lower magnitude is applied to the input circuit of amplifier unit 4, the reduced amplitude being brought about by the action of negative feedback. This is illustrated by this portion of the waveform 201, the amplitude actually shown being greatly exaggerated since the voltage at this point for a negative feedback amplifier having a high forward gain would actually be very small. Since amplifier unit 4 inverts the input wave, waveform 202 is shown of opposite phase from that illustrated for waveform 201 and of somewhat greater amplitude. It might be emphasized at this point that the relative amplitudes of these waveforms are highly exaggerated for illustrative purposes. During the negative excursion of the input signal and prior to the instant T1, the output of amplifier unit 4 is increasing toward a positive peak and this voltage is being applied to capacitor 7 through diode 5. Consequently, this portion of the waveform appears at the input to amplifier unit 8, is amplified without inversion and appears at terminal 2 as well as being fed back through resistor 13. When the input voltage wave has reached its negative peak at time T1, the charge on capacitor 7 has reached its positive maximum as illustrated by wave form 203. During the first part of the short time interval t, immediately following time T1, the output voltage of amplifier unit 4 starts to lower, thus causing diode 5 to become nonconductive. An inherent property of diodes is utilized to cause the voltage on capacitor 7 to remain substantially constant throughout this short time interval t. This property of a diode requires that a small forward direct voltage be applied to a diode before substantial conduction can take place.

Consequently, the voltage at the output terminal of amplifier unit 4 must lower below the trapped voltage on capacitor 7 by this small amount before diode 6 can become conductive. The period of time $t$ is that period of time existing between the instant diode 5 becomes nonconductive and diode 6 becomes conductive. During this interval, the path between amplifier units 4 and 8 is open at the diodes, thereby opening the negative feedback loop. Since the voltage trapped on capacitor 7 appears at the input of amplifier unit 8, a constant voltage exists at terminal 2. At the instant the negative feedback path opens, amplifier unit 4 suddenly begins operation without feedback so that the voltage at its output terminal suddenly lowers.

Differentiator 9 is normally producing a cosine voltage as indicated by waveform 204 but when this sudden voltage change occurs in the output circuit of amplifier unit 4, the differentiator produces a sharp negative pulse represented by the negative going pulse starting at the time T1 and existing throughout the time interval $t$. Horizontal dotted lines 204P and 204N, associated with waveform 204, illustrate the positive and negative threshold limits of the threshold circuit 10. Since the peak value of the cosine wave is less than these limits, there would normally be no transmission through the threshold circuit and the positive feedback path would remain effectively open. However, when the sharp negative pulse from the differentiator appears at the input of threshold circuit 10, the threshold is exceeded and this excess voltage appears as the negative pulse of waveform 205 at the input of amplifier unit 11. It is here amplified and inverted as shown by waveform 206 which appears at terminal 3 as well as being applied as positive feedback to the input of amplifier unit 4 through resistor 14. This positive feedback is, therefore, seen to produce a regenerative action which accentuates the negative going excursion in the output circuit of amplifier unit 4 as represented by the very steep drop from the positive peak shown in waveform 202.

At the end of the short time interval $t$, diode 6 becomes conductive and the negative feedback path is completed once again. The voltage on capacitor 7 is now brought sharply down and forced to follow the output wave of amplifier unit 4. Amplifier units 4 and 8 now resume operation as an ordinary operational amplifier until time T2 is reached, at which time the input signal reaches its positive peak as shown by waveform 200. At this instant diode 6 opens leaving a negative voltage trapped on capacitor 7 which remains thereon throughout a second time interval $t$ as indicated by waveform 203. During this short interval of time, the negative feedback path is again opened and the positive feedback path closed to develop the positive going pulse in the output circuit of the differentiator as shown in waveform 204 at time T2. As this pulse exceeds the positive threshold limit, it appears as a positive going pulse in the output circuit of the threshold unit 10 and as an inverted, amplified pulse at terminal 3 as shown in waveform 206. The remainder of the operation continues in the same manner previously described for the negative signal peak.

The operating sequence will be briefly summarized. When a signal wave is applied to terminal 1, the negative feedback path remains closed until its peak voltage is reached and during this period capacitor 7 is being charged toward the peak voltage through one of the diodes 5 or 6, depending upon the polarity of the input signal. When the peak is reached, a voltage proportional to this peak is trapped on capacitor 7 and held for a short interval of time determined by the inherent characteristics of the diodes 5 and 6. During the time that diodes 5 and 6 are open, the negative feedback loop is broken and a positive feedback loop is completed by reason of the rapidly changing voltage appearing at the output of amplifier unit 4 and by the response of the differentiator and threshold circuit. The differentiator 9 senses the rapid voltage change and responds by generating a sharp voltage pulse which continues throughout the interval of time $t$. That part of the generated pulse voltage in excess of a threshold limit passes through the threshold unit to complete the positive feedback path. Regeneration afforded by this positive feedback strongly accentuates the pulse emerging from the differentiator 9. The polarity of the pulse emerging from amplifier unit 11 and appearing at terminal 3 is always opposite that of the peak impressed on input terminal 1 and it always starts at the same instant that the peak is reached. This provides indications of the polarity and time of arrival of the peak. The amplitude of the peak is always proportional to the voltage trapped on capacitor 7 and, consequently, the voltage apeparing at output terminal 2 is indicative of the amplitude of the peak.

FIG. 2 shows a practical embodiment of the invention illustrated in FIG. 1 arranged for bipolar operation. Amplifier unit 4 comprises transistors Q1 and Q2, both of the NPN type. The emitter of transistor Q1 is grounded and its collector is connected through resistor 41 to a source of positive voltage, typically 24 volts. The base of transistor Q1 is connected to input terminal 1 through resistor 12. The emitter of transistor Q2 is connected through resistor 42 to ground and its collector is connected to the positive voltage source. The base of transistor Q2 is connected to the collector of transistor Q1. Thus, transistor Q2 is caused to act as an emitter follower to drive current into capacitor 7. Diodes 5 and 6 and capacitor 7 are connected to the output circuit of amplifier unit 4 in the same manner previously illustrated in FIG. 1.

Amplifier unit 8 comprises transistor Q3, also connected as an emitter follower with its base connected to the ungrounded end of capacitor 7. Its collector is connected to a source of positive voltage and its emitter is connected to ground through resistor 82. Another resistor 81 connects the base to the positive source. The negative feedback path is connected between the emitter of transistor Q3 and the base of transistor Q1 through a negative feedback resistor 13 and a ten-volt Zener diode 20. The action of this Zener diode is to provide bipolar operation by reason of causing the emitter of transistor Q2 to rise from approximately two volts, which it would have without the Zener diode, to about twelve volts at zero input signal. Output terminal 2 is connected to the emitter of transistor Q3 through a capacitor 83.

Differentiator 9 comprises a conventional circuit including a resistor 91 and a capacitor 92, the output being taken across resistor 91. This is applied to the emitters of transistors Q4 and Q6 which act as threshold devices by reason of their inherent emitter-to-base offset voltages. This voltage is of the order of 0.7 volt for silicon transistors. When a differentiator output peak of one polarity or the other appears across resistor 91 of sufficient magnitude to overcome the offset voltage of one of the transistors, this transistor is brought into operation to transmit the voltage peak to the amplifier unit 11.

Transistor Q4 is of the NPN type and has its collector connected to a source of positive voltage through resistor 101. Its collector is also connected to the base of transistor Q5 in amplifier unit 11 through a capacitor 102, the base of transistor Q5 also being connected to the source of positive voltage through a resistor 110. The bases of both transistors Q4 and Q6 are grounded. The emitter of transistor Q5 is connected to the positive voltage source through resistor 111 which, in turn, is shunted by capacitor 112. The collector of transistor Q5 is grounded through a resistor 113. This collector is also connected to output terminal 3 by way of capacitor 114.

It will be noted that transistors Q6 and Q7 are, respectively of types opposite from transistors Q4 and Q5 and that their circuits, including resistors 103, 115, 116 and 118 and capacitors 104, 117 and 119, are otherwise identical to those for Q4 and Q5. Also, by reason of the fact that these transistors are of the opposite type, their power supply is provided from a negative voltage source.

The action of threshold unit 10 and amplifier unit 11 may be further described by considering first that the differentiator output peak occurring across resistor 91 is negative going as illustrated at time T1 in waveform 204 of FIG. 1. When the threshold limit 204N is reached, the emitter of transistor Q4 becomes conductive, causing this transistor to amplify and deliver current into the base of transistor Q5 through capacitor 102. This current is represented by the negative pulse shown in waveform 205 of FIG. 1. The collector of transistor Q5 transmits an inverted, amplified replica of this pulse to output terminal 3 through capacitor 114, as illustrated by the positive pulse at time T1 in waveform 206 of FIG. 1. Positive going peak outputs from differentiator 9 act similarly on transistors Q6 and Q7, resulting in the negative pulse at time T2 in the waveform 206 of FIG. 1.

The embodiment used to illustrate the invention is particularly suitable for use with many conventional analog-to-digital converters. Most of the converters include some means for receiving a sample of an instantaneous value of the analog input data and, upon command from some control source, convert the analog sample value to a digital number. Immediately thereafter, another control pulse causes the converter to reset ready to convert another sample. In some cases, the converter is made to continuously and automatically recycle under control of a time counter driven by a clock. One well-known circuit of this type is described on page 133 of Digital Techniques for Computation and Control; Klein, Morgan and Aronson; Instruments Publishing Company (1958). The principal connections required to adapt the published circuit to operate with the present invention are quite simple. Output terminal 2 of this invention is connected to the ANALOG VOLTAGE terminal of the VOLTAGE COMPARATOR and output terminal 3 of this invention is connected to replace the 256th pulse lead to both the gate opening terminal of the GATE and the sweep starting terminal of the PHANTASTRON. These are the principal connections to be made. Some additional minor circuit changes are usually required when a specific design is attempted but they are all of a conventional nature and so familiar to those skilled in this art that they need not be described to obtain a full understanding of the manner of using the present invention. Another well-known converter using a binary mask and cathode-ray tube is described on page 386 of Digital and Sampled-Data Control Systems; J. T. Tou; McGraw-Hill Book Co., Inc. (1959). Output terminal 2 of this invention is applied to the vertical deflector plates of the published circuit while output terminal 3 is connected to its linear sweep circuit to trigger this sweep in a conventional manner at the instant a peak is reached.

What is claimed is:

1. A random peak amplitude detector circuit comprising a multistage amplifier having an input circuit and an output circuit, a network coupling two of its successive stages, said network connected to receive signal current flow from the first of said successive stages and comprising a capacitor connected in series with two parallel-connected diodes poled to alternately conduct upon reversals of said current flow, the input to the second of said successive stages being derived from across said capacitor, a negative feedback path coupling said output circuit to said input circuit, and a positive feedback path coupling the first of said successive stages to said input circuit, said positive feedback path including a differentiator circuit for feeding back a voltage determined by the time derivative of the voltage output from the first of said successive stages.

2. The combination of claim 1 and a threshold circuit inserted in said positive feedback path between said differentiating circuit and said input circuit.

3. The combination of claim 2 wherein said threshold circuit comprises a transistor having an inherent emitter-to-base offset voltage.

4. The combination of claim 2 and an amplifying means inserted in said positive feedback path to strongly accentuate the positive feedback action.

5. A random peak amplitude detector circuit comprising a multistage amplifier having an input circuit and an output circuit, a network coupling two of its successive stages, said network comprising a pair of parallel-connected diodes and a capacitor forming a series circuit, said diodes being poled in opposite directions to alternately conduct on reversals of current through said series circuit, the output circuit of the first of said two successive stages connected across said series circuit and the input circuit of the second of said successive stages connected across said capacitor, a negative feedback path coupling said amplifier output circuit to its input circuit, and a positive feedback path coupling the first of said successive stages to said amplifier input circuit, said positive feedback path including a differentiator circuit for feeding back a voltage determined by the time derivative of the voltage output from the first of said successive stages.

6. The combination of claim 5 and a threshold circuit inserted in said positive feedback path between said differentiator circuit and said amplifier input circuit.

7. The combination of claim 6 wherein said threshold circuit comprises a transistor having an inherent emitter-to-base offset voltage.

8. The combination of claim 6 and an amplifying means inserted in said positive feedback path to strongly accentuate the positive feedback action.

No references cited.

ARTHUR GAUSS, *Primary Examiner.*

R. H. EPSTEIN, *Assistant Examiner.*